United States Patent
Klemen et al.

(10) Patent No.: US 11,761,378 B2
(45) Date of Patent: Sep. 19, 2023

(54) BLEED AIR CHARGED COOLING SYSTEM WITH TURBO-GENERATOR

(71) Applicant: Rolls-Royce Corporation, Indianapolis, IN (US)

(72) Inventors: Donald Klemen, Carmel, IN (US); Russell E. White, Indianapolis, IN (US); Eric E. Wilson, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 500 days.

(21) Appl. No.: 16/539,785

(22) Filed: Aug. 13, 2019

(65) Prior Publication Data

US 2020/0361611 A1 Nov. 19, 2020

Related U.S. Application Data (60) Provisional application No. 62/847,152, filed on May 13, 2019.

(51) Int. Cl.
*F02C 6/08* (2006.01)
*F02C 7/18* (2006.01)
(Continued)

(52) U.S. Cl.
CPC ............... *F02C 6/08* (2013.01); *F02C 7/18* (2013.01); *F02C 7/143* (2013.01); *F02C 9/18* (2013.01); *F05D 2260/213* (2013.01)

(58) Field of Classification Search
CPC ................ F02C 6/08; F02C 9/18; F02C 7/18
See application file for complete search history.

(56) References Cited

U.S. PATENT DOCUMENTS

| 4,091,613 A | 5/1978 | Young |
| 4,706,908 A | 11/1987 | Huffman et al. |

(Continued)

OTHER PUBLICATIONS

Office Action from U.S. Appl. No. 16/410,837, dated Jul. 16, 2020, 19 pp.

(Continued)

*Primary Examiner* — Katheryn A Malatek
*Assistant Examiner* — Alyson Joan Harrington
(74) *Attorney, Agent, or Firm* — Shumaker & Sieffert, P.A.

(57) ABSTRACT

In some examples, propulsion, electrical generation, and cooling system. The system comprises a gas turbine engine including a compressor and a bleed air outlet from the compressor, wherein the compressor is configured to compress a first fluid, wherein a portion of the compressed first fluid is directed out of the bleed air outlet to define bleed air from the compressor. The system also includes a turbo-generator including a combustor, wherein the combustor is configured to receive the bleed air from the compressor and combust a fuel with the bleed air, wherein the turbo-generator is configured to generate electrical energy via the combustion of the fuel by the combustor. The system also includes an air cycle cooling system configured to remove heat via an air cycle cooling process, wherein the air cycle cooling process is charged via the bleed air from the compressor. A compressor of the air cycle cooling system may be driven by a turbine of the turbo-generator or a turbine of the gas turbine engine.

16 Claims, 6 Drawing Sheets

(51) Int. Cl.
*F02C 9/18* (2006.01)
*F02C 7/143* (2006.01)

(56) References Cited

U.S. PATENT DOCUMENTS

| | | |
|---|---|---|
| 7,464,533 B2 | 12/2008 | Wollenweber |
| 8,669,670 B2 | 3/2014 | Donnelly et al. |
| 9,010,114 B2 | 4/2015 | Krug et al. |
| 9,309,811 B2 | 4/2016 | Swann |
| 9,440,746 B2 | 9/2016 | Swann |
| 9,534,538 B1 * | 1/2017 | Cerny ................ F02C 7/268 |
| 9,932,903 B2 | 4/2018 | Pidcock et al. |
| 2003/0014979 A1 | 1/2003 | Summerfield |
| 2006/0059920 A1 * | 3/2006 | Saunders ............ F04D 27/02 |
| | | 60/782 |
| 2006/0162371 A1 * | 7/2006 | Lui .................... B64D 13/06 |
| | | 62/402 |
| 2012/0000205 A1 * | 1/2012 | Coffinberry ......... B64D 13/06 |
| | | 60/806 |
| 2012/0023962 A1 * | 2/2012 | Wichmann ........... F02C 6/06 |
| | | 60/773 |
| 2016/0347456 A1 * | 12/2016 | Bruno ................. B64D 13/06 |
| 2017/0106985 A1 * | 4/2017 | Stieger .................. F02C 3/13 |
| 2018/0134397 A1 | 5/2018 | Himmelmann et al. |
| 2019/0360401 A1 * | 11/2019 | Rambo ................ F02C 7/224 |

OTHER PUBLICATIONS

Notice of Allowance from U.S. Appl. No. 16/410,837, dated Jan. 28, 2021, 10 pp.
Corrected Notice of Allowance from U.S. Appl. No. 16/410,837, dated Feb. 18, 2021, 3 pp.
Amendment in Response to Office Action dated Jul. 16, 2020, from U.S. Appl. No. 16/410,837, filed Nov. 16, 2020, 18 pp.

* cited by examiner

BLEED AIR CHARGED COOLING SYSTEM WITH TURBO-GENERATOR

This application claims the benefit of U.S. Provisional Patent Application No. 62/847,152, filed May 13, 2019, the entire content of which is incorporated herein by reference.

TECHNICAL FIELD

The present disclosure relates to cooling and electrical systems for gas engine turbine powered vehicles, such as aircraft.

BACKGROUND

A gas turbine engine is a type of internal combustion engine that may be used to power an aircraft, or another moving vehicle. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

Gas turbine engine powered vehicles, such as aircraft, increasingly use electrical systems which may operate to provide auxiliary functions beyond vehicle propulsion. Electrical systems may be used to replace mechanical, hydraulic, and pneumatic drive systems in gas turbine engine powered vehicles. Gas turbine engine powered vehicles may include electrical energy generating systems to supply power for the electrical systems.

SUMMARY

In some examples, the present disclosure is directed to energy generation and cooling systems and techniques that provide, e.g., electrical energy to electrical systems of a gas turbine engine powered vehicle as well as cooling for systems of the vehicle. In some examples, the electrical energy generating system may include a turbo-generator having a combustor that drives the rotation of a turbine. Rotation of the turbine drives a generator, which converts the mechanical energy to electrical energy. Rather than employing a dedicated compressor that functions only to compress a fluid that is directed to the combustor of the turbo-generator, the combustor of the turbo-generator may be fluidically coupled to a bleed air output from a compressor of a gas turbine engine. The gas turbine engine may be used primarily for propulsion of the vehicle, such as an aircraft. The combustor of the turbo-generator may be fuelled independently from that of the combustor of the gas turbine engine. In some examples, the exhaust from the gas turbine engine of the vehicle may be fluidically coupled to the exhaust of the turbo-generator.

The system may include an air cycle cooling system (e.g., with an expander and compressor) configured to, e.g., remove heat from one or more components of the vehicle using an air cycle cooling process. The air cycle cooling system may be configured such that the air cycle cooling process is statically charged with bleed air from the compressor of the gas turbine engine. Charging the air cycle cooling process allows to the air cycle cooling system to perform the heat removal (e.g., cooling) process at a higher pressure than without the bleed air charge. The higher pressure of the air cycle cooling process may allow for higher density operation of the air cycle cooling system.

In some examples, the present disclosure is directed to a propulsion, electrical generation, and cooling system comprising a gas turbine engine including a compressor and a bleed air outlet from the compressor, wherein the compressor is configured to compress a first fluid, wherein a portion of the compressed first fluid is directed out of the bleed air outlet to define bleed air from the compressor; a turbo-generator including a combustor, wherein the combustor is configured to receive the bleed air from the compressor and combust a fuel with the bleed air, wherein the turbo-generator is configured to generate electrical energy via the combustion of the fuel by the combustor; and an air cycle cooling system configured to remove heat via an air cycle cooling process, wherein the air cycle cooling process is charged via the bleed air from the compressor.

In some examples, the present disclosure is directed to a method comprising compressing a fluid via a compressor of a gas turbine engine; wherein a portion of the compressed fluid is directed out of a bleed air outlet of the compressor to define bleed air from the compressor; receiving the bleed air via a combustor of a turbo-generator, wherein the combustor is configured to combust a fuel with the received bleed air, wherein the turbo-generator is configured to generate electrical energy via the combustion of the fuel by the combustor; and charging an air cycle cooling system via the bleed air from the compressor, wherein the air cycle cooling system is configured to remove heat via an air cycle cooling process.

The details of one or more examples are set forth in the accompanying drawings and the description below. Other features, objects, and advantages will be apparent from the description and drawings, and from the claims.

DETAILED DESCRIPTION

In some examples, the present disclosure is directed to energy generation and cooling systems and techniques that provide, e.g., electrical energy to electrical systems of a gas turbine engine powered vehicle as well as cooling for systems of the vehicle. For ease of description, examples of the disclosure will be primarily described in the context of aircraft as a gas turbine engine power vehicle. However, examples of the disclosure are not limited to aircraft. As used herein, cooling may generally refer to removing heat, e.g., from a fluid or other component of the aircraft. The heat removal may or may not result in a reduction in temperature of a fluid or other component from which the heat is removed.

Gas turbine engine powered aircraft increasingly require significant amount of additional electrical power beyond that generated by the one or more gas turbine engines used by the aircraft for main propulsion. In some examples, electrical systems may be used to replace mechanical, hydraulic, and pneumatic drive systems in gas turbine engine powered vehicles, while also providing one or more auxiliary functions to the aircraft not directly related to propulsion. Those electrical systems may increase the electrical load requirements for the vehicle.

In some examples, electrical generators or other auxiliary power systems may be employed by gas turbine combustion engine power aircraft to satisfy the transient and/or continuous electrical loads associated with the electrical system(s). However, the addition of such power generating systems may result in the addition of more volume and weight to the aircraft than is desirable, particularly in weigh sensitive aircraft.

Additionally, gas turbine engine powered aircraft may also increasing require cooling of electronic systems used for operation of the vehicle. Air cycle cooling systems may be employed to remove heat from one or more of heat generating electronic systems (e.g., to cool the systems during operation). Gas turbine engine powered aircraft may also employ air cycle cooling systems, e.g., as a part of the aircraft's environmental control system that provides cool air to ventilate the cabin of the aircraft. In some instances, the air cycle cooling systems may also require the addition of more volume and weight as the needs for cooling or other heat removal from aircraft systems increase. At high altitudes additional stages of compression may be required depending on application to reduce sizes of heat exchangers or maintain a minimum pressure.

In accordance with examples of this disclosure, a vehicle system including a gas turbine engine for propulsion may additionally include a turbo-generator configured to generate electrical energy for the vehicle system. Rather than include a compressor dedicated to supplying compressed fluid to a combustor of the turbo-generator, the combustor of the turbo-generator may receive compressed fluid in the form of bleed air from one or more compressors of the gas turbine engine. The compressed fluid may be mixed with a fuel within the combustor and combusted to drive a turbine that drives a generator that generates electrical energy. In some examples, the exhaust stream from the turbo-generator may be fluidically coupled to the exhaust stream from the gas turbine engine.

The turbo-generator and gas turbine engine may provide for a parallel combustion system in which the same compressor supplies compressed air to the respective combustors of the gas turbine engine and turbo-generator of the system. In some examples, the fuel supplied to the combustor of the turbo-generator may be controlled independently from the fuel supplied to the combustor of the gas turbine engine for operation of the engine. For example, the amount of fuel supplied to the combustor of the turbo-generator may be increased or decreased while the amount of fuel supplied to the combustor of the gas turbine engine may be relatively constant, and vice versa.

The vehicle system may include an air cycle cooling system that is charged by the bleed air from the compressor. For example, the bleed air from the compressor of the gas turbine engine used for propulsion may be directed to the air cycle cooling system to increase the operating pressure of the air cycle cooling process, e.g., in addition to the bleed air being used by the turbo-engine for power generation. Charging the air cycle cooling process allows to the air cycle cooling system to perform the heat removal (e.g., cooling) process at a higher pressure than without the bleed air charge. The higher pressure of the air cycle cooling process may allow for higher density and/or higher temperature operation of the air cycle cooling system. The compressor of the air cycle cooling may be driven by the turbine of the turbo-generator and/or the turbine of the gas turbine engine.

In some examples, systems of the disclosure may provide for one or more advantages. For example, a parallel combustion power turbine system that uses bleed air from a primary compressor of the main propulsion system with an independently fuelled turbo-generator may provide for one or more advantages. The bleed air from the compressor of the gas turbine engine may be directed into the combustor of the turbo-generator and the exhaust of the turbo-generator may be tied to the gas turbine engine exhaust. Such a design may eliminate additional fluid inlets and exhausts (e.g., to reduce the weight and/or volume required for the turbo-generator). The size of such the turbine-combustor-generator system may be relatively small since it does not require a compressor and/or a starter, and the generator can be sized directly with the turbo system. The addition of the turbo-generator may satisfy an increased electrical load of the aircraft. In some examples, the turbo-generator may be fluidically couple to the bleed air output of the gas turbine engine in a relatively remote location, e.g., in the fuselage of an aircraft. In such an example, the combustor of the turbo engine may receive bleed air from multiple gas turbine engines of the vehicle rather than a single gas turbine engine.

In some examples, air cycle cooling systems that are charged by bleed air from the gas turbine engine may provide for a reduction in the volume and/or weight of one or more components of the system (e.g., expander and/or compressor) compared to the same or similar systems that are not charged by bleed air, while still providing for adequate heat removal. For example, the higher density and/or higher temperature of the air cycle cooling system resulting from the charging of the air cycle cooling system with bleed air may reduce heat exchanger size and does not require a continuous bleed from the engine improving engine efficiency since the power is supplied by combustion. This can result in a high speed, lightweight cooling system.

Some examples of the disclosure may provide aircraft in which it is desirable to have relatively high power density and relatively low weight for flight.

Figure 1:
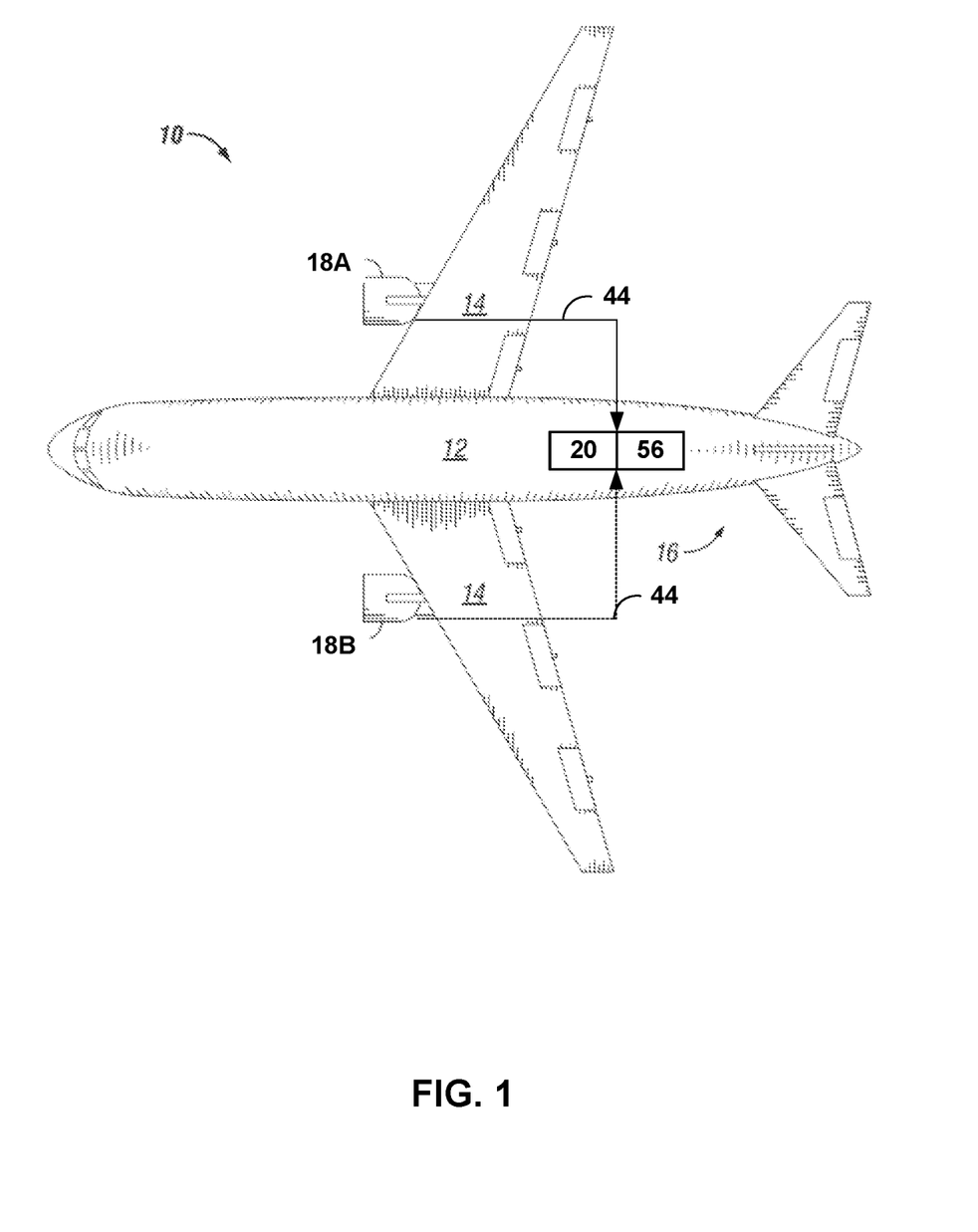
FIG. 1 is a conceptual diagram illustrating an example vehicle in accordance with an example of the present disclosure.

FIG. 1 is a conceptual diagram illustrating an example vehicle in accordance with an example of the present disclosure. In some examples, the vehicle includes an aircraft 10. In other examples, the vehicle may include any type of gas turbine engine powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas turbine engines 18A and 18B (collectively, "gas turbine engines 18"), generating system 20 and air cycle cooling system 56. In other examples, aircraft 10 may include a single gas turbine engine 18 or a plurality of propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft. Aircraft 10 may employ any number of wings 14. Empennage 16 may employ a single or multiple flight control surfaces. Gas turbine engines 18 may be the main propulsion systems of aircraft 10.

In accordance with some examples of the disclosure, generating system 20 and air cycle cooling system 56 are fluidically coupled to gas turbine engines 18A to receive a compressed fluid in the form bleed air from gas turbine engines 18A. As will be described further below, the bleed air may be directed from one or more compressors of gas turbine engine 18A to a combustor of turbo-generators 20, e.g., rather than turbo-generator 20 including a dedicated compressor configured solely to supply the combustors of turbo-generator 20 for operation in generating electrical energy. The bleed air may also be directed to the air cycle cooling system to charge the air cycle cooling process, e.g., by boosting or otherwise increasing the operating pressure of the air cycle cooling process.

In the example of FIG. 1, air cycle cooling system 56 and turbo-generator 20 are located remote from that of engine 18A in fuselage 20 of aircraft 10. In other examples, one or both of cooling system 56 and turbo-generator 20 may be located in another portion of aircraft 10, e.g., mounted to or otherwise attached directly to or in close proximity to gas turbine engine 18A. While the example of FIG. 1 illustrates air cycle cooling system 56 and turbo-generator 20 as only being fluidically coupled to bleed air 44 of engine 18A, in other examples, air cycle cooling system 56 and turbo-generator 20 may additionally, or alternatively, be fluidically coupled to a bleed air output from a compressor of engine 18B has shown by the dashed line in FIG. 1). In one example, air cycle cooling system 56 and turbo-generator 20 may be fluidically coupled to bleed air outputs, e.g., with air cycle cooling system 56 being fluidically coupled to bleed air 44 from engine 18A and turbo-generator 20 being fluidically coupled to bleed air from engine 18B. While a single turbo-generator 20 and a single air cycle cooling system 56 are shown for aircraft 10, in other examples, aircraft 10 may include more than one turbo-generators 20 and/or more than one air cycle cooling systems 56, with each being fluidically coupled to the bleed air outlet of at least one gas turbine engine.

Figure 2:
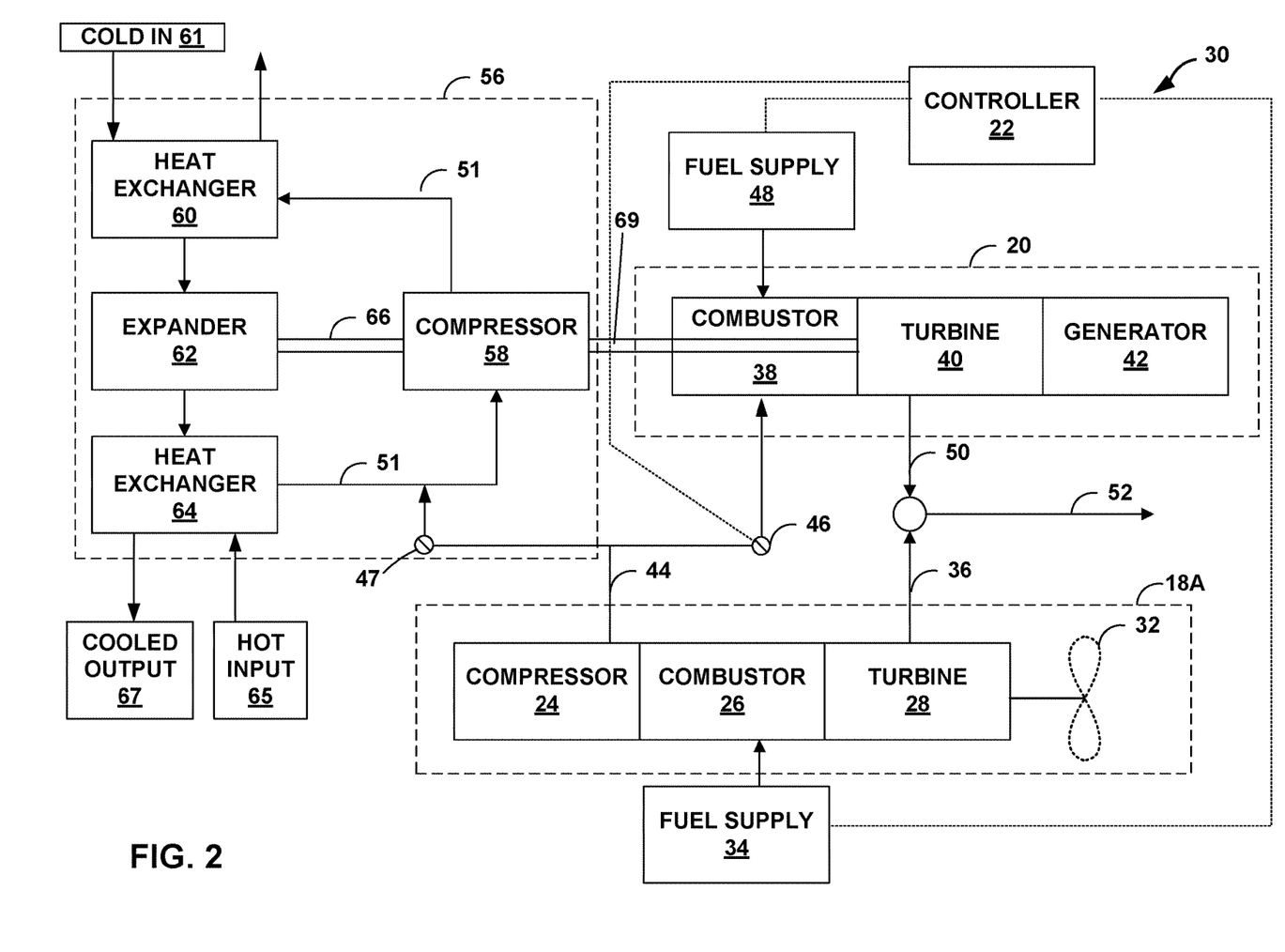
FIG. 2 is a conceptual and schematic diagram illustrating an example propulsion, electrical energy generation, and cooling system in accordance with an example of the present disclosure.

FIG. 2 is a conceptual and schematic diagram illustrating propulsion, electrical energy generation, and cooling system 30 in accordance with an example of the present disclosure. System 30 includes gas turbine engine 18A, turbo-generator 20, and air cycle cooling system 56 of FIG. 1. FIG. 2 is described with regard to gas turbine engine 18A for ease of description. Such description is applicable to gas turbine engine 18B.

Propulsion, electrical energy generation, and cooling system 30 includes gas turbine engine 18A as a main engine, i.e., a main propulsion engine. Although described herein as with respect to an aircraft propulsion system, in other examples, gas turbine engine 18A may be a propulsion system for providing propulsive thrust to any type of gas turbine engine powered vehicle, as discussed above, or configured to provide power any suitable nonvehicle system including gas turbine engine 18A.

Engine 18A is a primary propulsion engine that provides thrust for flight operations of aircraft 10. In some examples, engine 18A may be a two-spool engine having a high pressure (HP) spool and a low pressure (LP) spool. In other examples, engine 18A may include three or more spools, e.g., may include an intermediate pressure (IP) spool and/or other spools. In some examples, engine 18A is a turbofan engine, where the LP spool is operative to drive a propulsor in the form of a turbofan (fan) system. In other examples, engine 18A may not include a LP spool or fan system. In some examples, engine 18A may include any suitable turbine powered-engine propulsion system, including but not limited to, a turbojet engine or a turboprop engine.

As illustrated in FIG. 2, engine 18A includes compressor 24 (e.g., at least one compressor), combustor 26 (e.g., at least one combustor), turbine 28 (e.g., at least one turbine), and propulsor 32 (e.g., at least one propulsor). Combustor 26 is fluidically disposed between compressor 24 and turbine 28 (e.g., disposed between compressor 24 and turbine 28 such that air or another fluid may flow from compressor 24 to combustor 26 to turbine system 28).

Compressor 24 may be configured to compress fluid, such as intake air or another gas and selectively provide the compressed fluid to combustor 26. Although not shown in FIG. 2, compressor 24 may be operably coupled to turbine 28, e.g., by a shaft. Compressor 24 may receive fluid from an intake, compress the fluid, and distribute compressed fluid to combustor 26. Compressor 24 may be an axial compressor, a centrifugal compressor, or another type of compressor that produces compressed fluid.

In some examples, compressor 24 may include a single compressor or at least two compressors. For example, compressor 24 may include a low pressure (LP) compressor and (e.g., followed by) a high pressure (HP) compressor, where the HP compressor is driven by a different shaft than that of the LP compressor. In such cases, the speed of the shaft driving the HP compressor may be different from that of the speed of the shaft driving the LP compressor.

Combustor 26 is configured to receive the compressed fluid from compressor 26 in addition to fuel from fuel supply 34. Combustor 26 is further configured to introduce the received fluid and ignite the compressed fluid, thus combusting the fuel to generate energy. The energy generated by igniting the compressed fluid in combustor 26 may be extracted by turbine 28, causing a shaft to which turbine 28 is coupled to rotate, thereby driving propulsor 32. Combustor 26 may be a single combustor or at least two combustors. In some examples, combustor 26 includes a combustion liner (not shown) that encloses a continuous combustion process. In other examples, combustor 26 may take other forms, and may be, for example, a wave rotor combustion system, a rotary valve combustion system, a pulse detonation combustion system, or a slinger combustion system, and may employ deflagration and/or detonation combustion processes.

Turbine 28 may be fluidically coupled to combustor 26 such that turbine 28 receives moving, combusted fluid from combustor 26 and converts energy of the moving fluid to mechanical energy (e.g., via a rotating shaft). The rotating shaft of turbine 28 may drive propulsor 32 to produce propulsion for system 30 (e.g., used to propel vehicle 10). Turbine 28 may be a single turbine or at least two turbine, and may include any suitable type of turbine. Turbine 28 includes an exhaust outlet to expel fluid exhaust 36 from turbine 28 resulting from the combustion of the compressed fluid.

In addition to gas turbine engine 18A, system 30 includes turbo-generator 20 that is configured to generate electrical energy (e.g., electrical power) for system 30. As will be described in further detail below, the electrical energy generated by turbo-generator 20 may be used to supply electrical power used to operate, at least in part, one or electrical systems of vehicle 10 that require electrical load to operate. As shown, turbo-generator 20 includes combustor 38, turbine 40, and generator 42. Combustor 38 and turbine 40 are separate from combustor 26 and turbine 28 of gas turbine engine 28, e.g., in that combustor 38 and turbine 40 are operably coupled to drive generator 42 while combustor 26 and turbine 28 are operably coupled to drive propulsor 32.

Combustor 38 is configured to receive a compressed fluid from compressor 24 and fuel from supply 48. While fuel supply 48 is shown as being separate from fuel supply 34 in FIG. 2, in other examples, combustor 38 may be supplied with fuel from the same source as combustor 26. Regardless of whether or not the fuel supplies are separate or the same for combustor 38 and combustor 26, in some examples, the fuel may be supplied (e.g., the amount supplied) to combustor 38 independently from that of combustor 26, e.g., under the control of controller 22.

Rather than including a separate compressor dedicated to providing compressed fluid to combustor 38, turbo-generator 20 is configured to receive compressed fluid from compressor 24 of engine 18A, in the form of bleed air 44 from compressor 24. As shown in FIG. 2, compressor 24 includes a bleed air outlet through which bleed air 44 is directed to combustor 38. The fluid compressed by compressor 24 defines bleed air 44 exiting compressor via the bleed air outlet. Bleed air valve 46 is located between compressor 24 and combustor 38 and may be actuated or otherwise operated by controller 22 to control the amount of bleed air 44 (e.g., flow rate) supplied to combustor 38. Combustor 38 may be configured such that bleed air 44 is the only compressed fluid received during operation of turbo-generator 20, e.g., without receiving another compressed fluid in addition to the bleed air during operation combustor 38. Combustor 38 may receive bleed air 44 without bleed air 44, e.g., being compressed by another compressor after leaving compressor 24 of gas turbine engine 18A, being expanded by an expander, and/or acted on by another mechanism that modifies the compression of bleed air 44.

In some examples, by supplying combustor 38 with compressed fluid in the form of bleed air from compressor 24 of gas turbine engine 18A, turbo-generator 20 may be combined with or otherwise incorporated (e.g., retrofit) with gas turbine engine 18A without adding weight and/or volume resulting from an additional compressor(s) to the weight and/or volume of gas turbine engine 18A. For example, turbo-generator 20 may not include a separate compressor shaft that would otherwise be required to provide compressed fluid to combustor 38 to operate turbo-generator 18A to generate electrical energy. Engine 18A also does not require a shaft to drive generator 42 directly which may be limited by power, speed, or availability.

Combustor 38 is configured to introduce the received compressed fluid in the form of bleed air 44 and ignite the fuel with the compressed fluid to generate energy. The ignition of the fuel combusts the fuel. The energy generated by igniting the compressed fluid in combustor 38 may be extracted by turbine 40, causing a shaft 66 to which generator 42 and compressor 58 are coupled to rotate. Combustor 38 may be a single combustor or at least two combustors. In some examples, combustor 38 includes a combustion liner (not shown) that encloses a continuous combustion process. In other examples, combustor 38 may take other forms, and may be, for example, a wave rotor combustion system, a rotary valve combustion system, a pulse detonation combustion system, or a slinger combustion system, and may employ deflagration and/or detonation combustion processes.

Turbine 40 may be fluidically coupled to combustor 38 such that turbine 40 receives moving, combusted fluid from combustor 38 and converts energy of the moving fluid to mechanical energy (e.g., via a rotating shaft). Generator 42 may then convert the mechanical energy of the rotating shaft to electrical energy. For example, the rotating shaft of turbine 40 may rotate an electromagnetic rotor (also referred to as an armature in some examples) of generator 42 relative to a stator (not shown) that defines a stationary magnetic field to generate electrical current through electromagnetic induction. Turbine 40 may be a single turbine or at least two turbine, and may include any suitable type of turbine.

Generator 42 may be any suitable type of electrical generator configured to generate electrical current from the rotation of the shaft driven by turbine 40. For example, these generators may be of field wound, permanent magnet, induction type machines. The electrical energy generated by generator 42 may be used to provide operational power to one or more electrically operated systems of vehicle 10. In some examples, generator 42 may be configured to generate high powered transient loads. Example electrical systems that may be powered by generator 42 include hydraulic and/or pneumatic drive systems, environmental control systems, communications systems, directed energy systems, radar systems, auxiliary power unit systems, and/or lift systems.

Turbine 40 includes an exhaust outlet to expel fluid exhaust 50 from turbine 40 resulting from the combustion of the compressed fluid. In the example of FIG. 2, exhaust 50 from turbine 40 is fluidically coupled to exhaust 36 from turbine 28 to form combined turbine exhaust flow 52. For example, a fluid flow conduit defining the flow of exhaust 36 from turbine 28 may be fluidically coupled to another fluid flow conduit defining the flow of exhaust 50 from turbine 40 to a single fluid flow conduit defining combined turbine exhaust 52. In this manner, turbo-generator 20 may not require significant additional exhaust flow conduits beyond that already provided by gas turbine engine 18A. Accordingly, turbo-generator 20 may be easily combined with or otherwise incorporated (e.g., retrofit) with gas turbine engine 18A without adding significant mechanical changes, weight and/or volume to the gas turbine engine 18A. In other examples, exhaust 50 and exhaust 36 may not be combined with each other into single exhaust stream 50.

As described herein, system 30 includes air cycle cooling system 56 that is configured to remove heat from hot input 65, using an air cycle cooling process, which results in cooled output 67 from heat exchanger 64. Air cycle cooling system 56 may carry out the air cycle cooling process in a closed loop manner using fluid 51. Fluid 51 may be a liquid or gas, and may be any suitable refrigerant gas such as R123, R245, or R744. In the example shown, air cycle cooling system 56 includes compressor 58, first heat exchanger 60, expander 62, and second heat exchanger 64, which are fluidically coupled to each other in the manner described herein and indicated in FIG. 2 and mechanically coupled to turbine 40 of system 20. In some examples, turbine 40 of turbo-generator 20 may drive compressor 58 and/or expander 62, e.g., via shaft 69. For example, as shown in FIG. 2, turbine 40 may drive compressor 58 and/or expander 62 via shaft 69. Turbine 40 may drive compressor 58 and expander 62 via the same shaft or independent shafts. Compressor 58 may be mechanically coupled to expander 62 via shaft 66. Expander 62 may recover energy from the compresses air or other fluid (e.g, in the form of spring energy) and drive compressor via shaft 66 to reduce the power to drive compressor 58. Additionally, or alternatively, turbine 28 of engine 18A may be mechanically coupled (e.g., via one or more shafts) to compressor 58 and/or expander 62 to drive compressor 58 and/or expander 62.

In operation, fluid 51 receives heat from hot input 65 by second heat exchanger 64, e.g., to increase the enthalpy and temperature of fluid 51. The transfer of heat to fluid 51 within second heat exchanger 64 from hot input 65 to fluid 51 removes heat from hot input 65, e.g., to cool hot input 65 in the form of cooled output 67. Hot input 65 may be air pre-charged by bleed air from turbine 18A, or a closed refrigerant loop pre-charged at installation.

Compressor 58 compresses the output of second heat exchanger 64 to increase the pressure of fluid 51, which also increases in the temperature of fluid 51. The compressed, "high" temperature fluid 51 exits compressor 58 and is directed into first heat exchanger 60. First heat exchanger 60 is configured to transfer heat from fluid 51 to cold input 61. Cold input 61 may be any suitable source, such as, relatively cold air from the environment outside of aircraft 10, or fuel. The heat removed from fluid 51 by first heat exchanger reduces the enthalpy of fluid 51. Upon exiting first heat exchanger 60, expander 62 expands fluid 51 to decrease the pressure of fluid 51. The work provided by the expansion of fluid 51 by expander 62 rotates shaft 66, which in turn drives compressor 58. As such, expander 62 may recover energy from the compressed air or other fluid (e.g, in the form of spring energy) and drive compressor via shaft 66 to reduce the power to drive compressor 58, e.g., by turbine 40. Alternatively, in some examples, an expansion valve may be used to drop the pressure and the compressor 58 is driven with turbine 40 but such an example does not recover work like that of examples using expander 62. The expansion of fluid 51 by expander 62 may also cool fluid 51. The cooled fluid 51 enters second heat exchanger 64, where heat is transferred to fluid 51 from hot input 65, as described above.

As described herein, the air cycle cooling process performed by air cycle cooling system 56 may be charged by bleed air 44 from compressor 24 of gas turbine engine 18A. As shown in FIG. 2, compressor 24 is fluidically coupled to air cycle cooling system 56 such that bleed air 44 charges fluid 51 to increase the operating pressure of system 56. For example, bleed air 44 may pressurize fluid 51 between second heat exchanger 64 and compressor 58 in the configuration shown in FIG. 2 such that fluid 51 increases in pressure compared to that in which bleed air 44 is not employed to charge fluid 51 in system 56. In the example of FIG. 2, a portion of bleed air 44 is directed to system 56 may valve 47 with another portion being directed to combustor 38 of turbo-generator 20. In other examples, separate flow conduits from compressor 24 may be employed to define separate fluid flow streams of bleed air from compressor 24, e.g., to allow for bleed air from separate compressor stages to be fed to combustor 38 and air cycle cooling system 56.

Valve 47 may be any suitable valve. In some examples, valve 47 may be a check valve or other one-way valve that only allows flow of bleed air 44 to air cycle cooling system 56.

Charging fluid 51 with bleed air 44 from compressor 24 may increase the density and/or temperature of fluid 51 in the operation of system 56. For example, the temperature of fluid 51 may be at least about 125 degrees Fahrenheit entering the compressor and 300 degrees Fahrenheit exiting the compressor. Similarly, in some examples, the density of fluid 51 in increases from below atmospheric conditions to about 0.15 lb/ft3 to about 0.20 lb/ft3. Other values are contemplated. As a result of the increase in density and/or temperature of fluid 51, the size and weight of one or more components of air cycle cooling system 56 may be decreased, e.g., as compared to the same air cycle cooling system but without being charged by bleed air 44. Likewise, using the same size and weight components, air cycle cooling system 56 being charged by bleed air 44 may provide for an increase in cooling capacity exceeding 2:1 compared to the same system operation without being charged by bleed air 44.

As an illustration of one or more benefits of charging the air cycle cooling process of system 56 with bleed air 44, FIG. 6 described further below shows the air cycle cooling of system 56 with charged ("boosted") 98 and uncharged operation 96 plotted on a pressure-enthalpy chart. As illustrated in FIG. 7, the same amount of heat is rejected for the cycle with a reduction in compressor size of 2.7:1, attributed to boosted cycle.

In some examples, bleed air 44 may configured to charge air cycle cooling system 56 such that fluid 51 entering compressor 58 is increase by at least about 200%, but can be increased as high as full compressor boost (20×=2000%) as compared to the pressure of fluid 51 without being charged by bleed air 44. In some examples, fluid 51 entering compressor 58 may have a pressure initially at atmospheric pressure and immediately boosted to high engine compressor pressure which depends on the operating altitude. It can range from 160 psi to 600 psi and selection depends on system design optimization such as seal leakage, tube sizing & weight. The boost pressure may also pass thru a filter to ensure cleanliness of the cooling cycle components.

Compressor 58 may be any suitable compressor configured to function as described herein. In some examples, compressor 58 include a single compressor or at least two compressors, and may have a single stage or more than one stage. As described above, compressor 58 and expander 62 are connected by shaft 66, with one or both being driven by turbine 40, e.g., via shaft 69, (or optionally driven by turbine 28 of engine 18A via suitable mechanical coupling) to provide an efficient cycle to transfer heat from hot input 65 out thru heat exchanger 60. In some examples, shaft 66 may drive additional pumps for lubrication or scavenge. Expander 62 may be any suitable expander, e.g., that expands fluid 51 to decrease the pressure and extract work from the expansion to improve cycle efficiency. In some examples, expander 62 may include an expansion turbine, which removes energy from fluid 51 with blades that are driven by the expansion of fluid 51. In some examples, compressor 58 and expander 62 may operate at relatively high speeds using centrifugal or axial flow components at about 16000 rpm or greater. Expander 62 recovers some compression work (gas acts as a spring) reducing cycle power. The air cycle may be driven from turbo-generator 20 and/or engine 18A (e.g., turbine 40 and/or turbine 28) but still may require a mechanical drive.

First heat exchanger 60 and second heat exchanger 64 may be any suitable heat exchanger configured to function as described herein. In some examples, first heat exchanger 60 may be air to air, air to fuel, or air to oil heat exchangers using existing or emerging technologies. Although not shown, in some examples, air cycle system 56 includes a recuperator as an additional component, e.g., where temperature limits create a problem. In some examples, air cycle system 56 may include an expansion valve, where the expansion valve is configured to provide additional control of cycle temperatures.

As described above, propulsion, electrical energy generation, and cooling system 30 includes controller 22. Controller 22 may include control circuitry the implements control of system 30. Controller 22 may be operationally coupled to gas engine 18A, turbo-generator 20, and air cycle cooling system 56. Controller 22 may be configured to individually and selectively control the components of system 30 such that system 30 implements the techniques described herein. Controller 22 may comprise any suitable arrangement of hardware, software, firmware, or any combination thereof, to perform the techniques attributed to controller 22 herein. Examples of controller 22 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 22 includes software or firmware, controller 4 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 2, controller 22 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 4 (e.g., may be external to a package in which controller 22 is housed).

Although controller 22 is generally described as being the primary unit for controlling each of the components of system 30 for performing the techniques described herein, in some examples, the individual components of system 30 may include additional functionality for performing some or all of the operations described below with respect to controller 22. For example, a combination of one or more of compressors 24 and 58, combustors 26 and 38, turbines 28 and 40, propulsor 32, generator 42, expander 62, and heat exchangers 60 and 64 may include components for controlling the consumption, generation, and distribution of energy throughout system 30 and aircraft 10.

Figure 3:
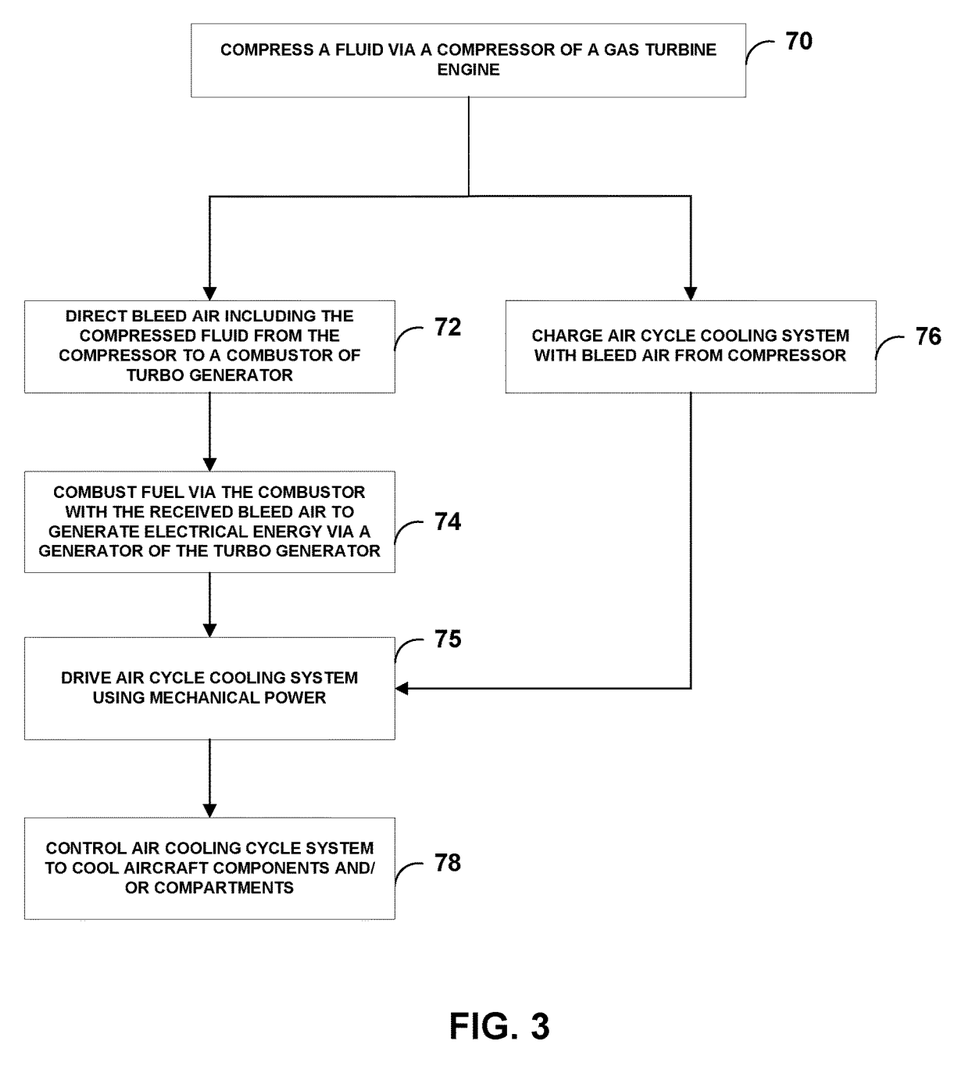
FIG. 3 is a flow diagram illustrating an example technique in accordance with an example of the present disclosure.

FIG. 3 is a flow diagram illustrating an example technique for generating electrical energy and driving an integrated cooling system using a turbo-generator that receive bleed air from the compressor of a gas turbine engine. The technique of FIG. 3 also includes charging an air cycle cooling system using bleed air from the compressor of the gas turbine engine. For ease of description, the example technique of FIG. 3 is described with respect to system 30 of FIG. 2, although any suitable system may implement the example technique of FIG. 3.

As shown in FIG. 3, controller 22 controls compressor 24 of gas turbine engine 18A to compress an intake fluid, e.g., during operation of gas turbine engine 18A to generate propulsion (70). Controlled 22 may then control bleed air control valve 46 to supply combustor 38 of turbo-generator 20 with a portion of the compressed fluid from compressor 24 in the form of bleed air 44 (72). For example, controller 22 may control bleed air control valve 46 such that a portion of the fluid compressed by compressor 24 is received by combustor 38 with another portion being directed to combustor 26 of gas turbine engine. In some examples, bleed air 44 from compressor 24 may have a pressure as required during flight propulsion and turbo-generator demand.

In examples in which compressor 24 includes a HP stage and LP stage, bleed air 44 may be supplied from the LP stage, HP stage, or both. In some examples, supplying combustor 38 with bleed air 44 from compressor 24 may cause compressor 24 to speed up, thus resulting in an increase in total available cycle power of the gas turbine engine 18A and turbo-generator 20, than would be available for using engine 18A with a mechanical drive. In general, if compressor 24 include multiple stages, bleed air 44 may be supplied from one, more than one, or all of the stages.

Controller 22 may also control fuel supply 48 to supply fuel to combustor 38 of turbo-generator 20 and control fuel supply 34 to supply fuel to combustor 26 of gas turbine engine 18A. Controller 22 may control combustor 38 to ignite and combust the fuel with bleed air 44 received from compressor 24 (74). The ignition and combustion of the fuel with bleed air 44 may cause turbine 40 and generator 42 to generate electrical energy as described above. Similarly, controller 22 may control combustor 26 to ignite and combust the fuel with compressed fluid from compressor 24. The ignition and combustion of the fuel with the compressed fluid may cause turbine 28 and propulsor 32 to generate propulsion for vehicle 10 as described above.

In some examples, controller 22 may operate system 30 such that combustor 26 and combustor 38 combust with each other in parallel, e.g., as the two combustors are combusting at the same time and driving different turbines. The compressor mass flow splits between two turbines, and mass flow is conserved. This may be the same Rankine cycle, the combustion and turbine expansion however are distributed to two units. Turbo-generator 20 may require an engine supply compression to operate. In a multi engine application, one or more engines may be shut off to save fuel at some point during operation. Under this condition, the turbo-generator 20 may be supplied with compressed fluid by other engines that remain operating.

During operation of engine 18A and turbo-generator 20, controller 22 may adjust the amount of compressed fluid supplied to combustor 26 and combustor 38, e.g., by adjusting bleed air control valve 46. For example, controller 22 may increase or decrease the amount of compressed fluid received by combustor 38 by opening or closing, respectively, valve 46 to increase or decrease the amount of bleed air 44 supplied from compressor 24. In some examples, there may be a maximum amount of bleed air 44 that may be supplied from compressor 24 to combustor 38 without significantly or undesirably impacting the amount of propulsion generated by engine 18A. In such examples, controller 22 may be configured to control valve 46 such that the amount of bleed air 44 supplied to combustor 38 is at or below that maximum threshold so as to prevent significantly or undesirably impacting the performance of gas turbine engine 18A. In some examples, bleed air 44 may be about 6 to 10% or less of all the compressed fluid flow generated by compressor 24 and could be more if an engine depending on flight conditions, number of engines, altitude.

Controller 22 may be configured to independently control the amount of fuel supplied to combustor 38 by fuel supply 48 relative to the amount of fuel supplied to combustor 26 by fuel supply. For example, while the combustion and power generation process of turbo engine 20A may be dependent to some extent on the operation of gas turbine engine 18A, controller 22 may be configured to increase or decrease the amount of fuel supplied to combustor 38 by fuel supply 48 without necessarily making an adjustment to the amount of fuel supplied to combustor 26 by fuel supply 34. In some examples, controller 22 may increase the amount of fuel supplied to combustor 38 by fuel supply 48 without changing the amount of fuel supplied to combustor 26 by fuel supply 34, or vice versa. Similarly, controller 22 may decrease the amount of fuel supplied to combustor 38 by fuel supply 48 without changing the amount of fuel supplied to combustor 26 by fuel supply 34, or vice versa.

As described above, generator 42 is configured to generate electrical energy during operation of turbo-generator 20 using bleed air from compressor 24 of gas turbine engine 18A. Controller 22 may control generator to generate a desired amount of electrical power, e.g., to accommodate transient or static loads of one or more electrical systems of aircraft 10. In some examples, generator 42 may be configured to generate 150 to 400 horsepower (HP), however the exact extraction depends on aircraft loads, design, application, and flight conditions. Other values are contemplated.

In addition to supplying turbo-generator 20 with bleed air 44, air cycle cooling system 56 is charged with bleed air 44 from compressor 24 of gas turbine engine 18A (76). For example, as described, bleed air 44 from compressor 24 may be directed to air cycle cooling system 56 across valve 47 (which may be a check valve) to fluid stream 51 before entering compressor 58 to charge or otherwise pressurize the air cycle cooling operation of system 56. Charging with bleed air 44 may increase the mean operating pressure for the air cycle cooling process performed by air cycle cooling system 20. In some examples, bleed air 44 may be directed from the highest pressure stage of compressor 24. In some examples, bleed air 44 that charges cooling system 56 is drawn from the same stage of compressor 24 are that directed to combustor 38 of turbo-generator 20, while in other examples, bleed air 44 that charges cooling system 56 has a different pressure and/or is drawn from a different stage of compressor 24 than that of bleed air 44 that is received by combustor 38 of turbo-generator 20. Filtration, conditioning, ice control features may all be considered in design of the cooling module.

Figure 5:
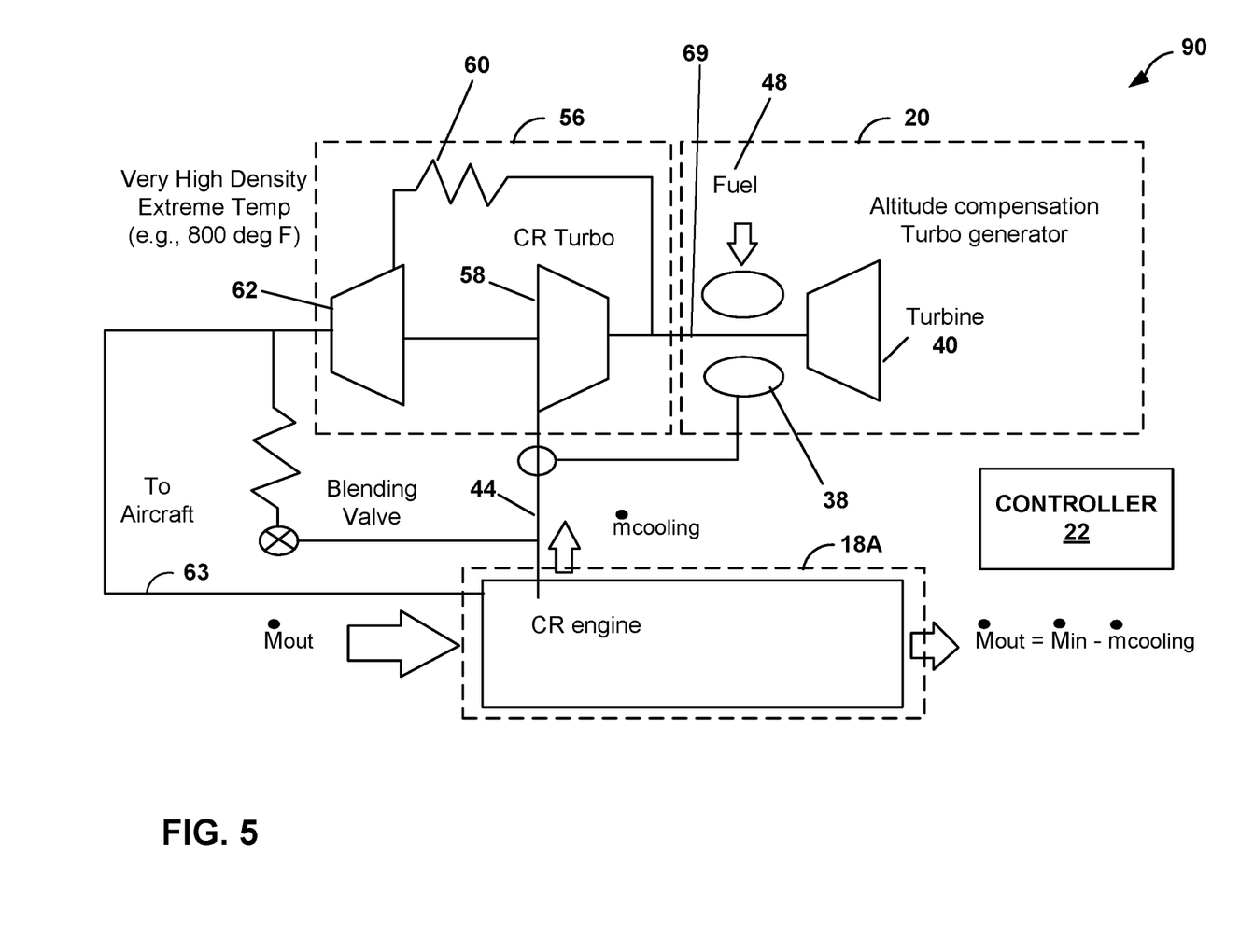
FIG. 5 is a conceptual and schematic diagram illustrating another example propulsion and electrical energy generation system in accordance with an example of the present disclosure.

As indicated in FIG. 3, air cycle system 56 may be driven using mechanical power as described herein (75). For example, turbine 40 of turbo-generator 20 may be mechanically coupled to compressor 58 and/or expander 62, e.g., via shaft 69, such that turbine 40 drive compressor 58 and/or expander 62 to operate as described herein. Additionally, or alternatively, turbine 28 of engine 18A may be mechanically coupled to compressor 58 and/or expander 62, e.g., as shown in FIG. 5, such that turbine 28 drives compressor 58 and/or expander 62 to operate as described herein.

Controller 22 may control cooling system 56 to perform an air cycle cooling process on a system of aircraft 10 (e.g., to cool aircraft components and/or compartments), as described herein, while cooling system 56 is charged with bleed air 44 (78). For example, air cycle cooling system 56 may cooling hot input 65 by removing heat from hot input 65 with heat exchanger 64 to provide for cooled output 67. Cool output 67 may be directed to, e.g., the cabin of aircraft 10 to provide relatively cool, low pressure air, e.g., as part of an aircraft environmental control system. In some examples, heat may be removed from hot input 65 to provide for cooled output 67 to cool one or more electrical systems of aircraft 10 that generate heat during operation by a higher pressure boosted pressure system.

Controller 22 may control the operation of cooling system 56 based on feedback from one or more temperature sensors, e.g., based on the sensed temperature of cooled output stream 67 and/or hot input stream 65. In some examples, controller 22 may control the amount of heat removed from hot input stream 65, e.g., by controlling the flow rate of fluid 51 through cooling system 56 and/or the pressure that compressor 58 compresses fluid 51 during operation of system 51, to control the temperature of cooled output stream 67.

Controller 22 may be configured to control system 30 such that cooling system 56 to substantially continuously (e.g., continuously) charged with bleed air 44 whenever cooling system 56 is performing a cooling operation. In other examples, controller 22 may be configured to control system 30 such that cooling system 56 is charged with bleed air 44 on a non-continuous basis, e.g., on a periodic or on-demand basis. For example, charging may be designed at lower pressures allowing continuous control of the low pressure side of the compressor and preventing degradation due to leakages. In other applications, charge may occur as aircraft is at high power low altitudes, such as takeoff conditions, to ensure the low side of the compressor is boosted to a minimum amount for performance. This creates a system with low maintenance, maintaining boost system pressure as controlled by controller 22.

In some examples, controller 22 may control turbo-generator 20 and/or air cycle cooling system 56 to operate at a substantially constant speed.

Figure 4:
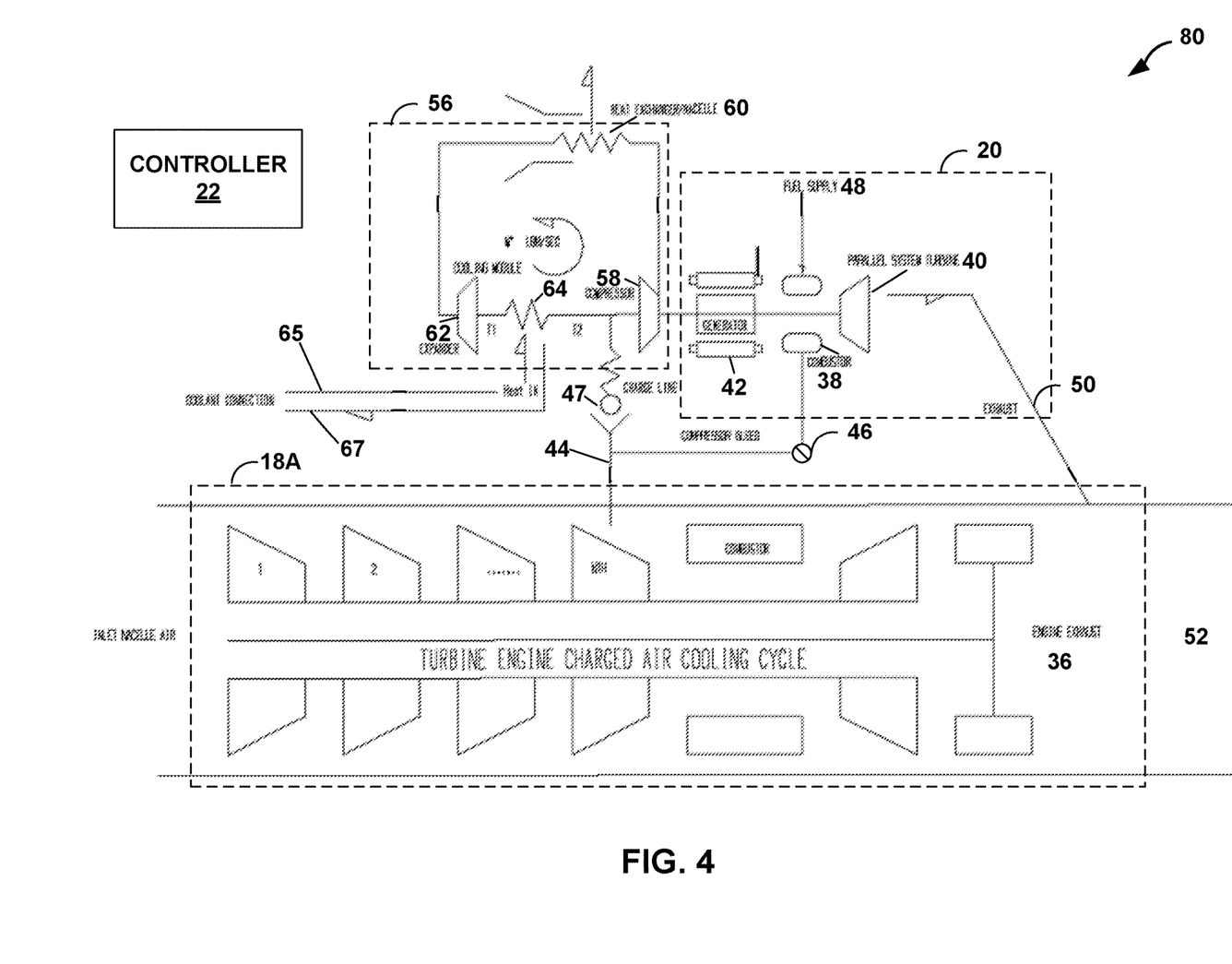
FIG. 4 is a conceptual and schematic diagram illustrating another example propulsion, electrical energy generation, and cooling system in accordance with an example of the present disclosure.

FIG. 4 is a conceptual and schematic diagram illustrating another example propulsion, electrical energy generation, and cooling system 80. In some examples, system 80 of FIG. 4 represents one example implementation of the example system 30 of FIG. 2. For ease of description, features that are the same or similar to that of system 30 are numbered similarly.

As shown, system 80 includes gas turbine engine 18A, turbo-generator 20, air cycle cooling system 56, and controller 22. Bleed air 44 may be directed from one or more compressors (not labeled) of gas turbine engine 18A to supply compressed fluid to combustor 38 of turbo-generator 20. Controller 22 may control the amount of bleed air 44 supplied to combustor 38 by controlling bleed air control valve 46. Fuel may also be supplied to combustor 38 by fuel supply 48 under the control of controller 22.

Combustor 38 may ignite and combust the received fuel with bleed air 44, which drives turbine 40. The rotation of turbine 40 drive generator 42 which generates electrical energy from turbine 40. Controller 22 also controls the operation of generator 42. For example, controller 22 may control field or output power of the generator to provide power quality required by the application. Exhaust 50 from turbo-generator 20 may be combined with the exhaust 36 from gas turbine engine 18A into a single exhaust flow 52 from system 80. In this manner, no additional exhaust conduits out of gas turbine engine 18A are required for turbo-generator 20A.

Bleed air 44 may also be directed from one or more compressors (not labeled) of gas turbine engine 18A to charge the operation of air cycle cooling system 56. Air cycle cooling system 56 performs an air cycle cooling process, with the process being charge by bleed air 44 via valve 47, to remove heat from hot input stream 65 to generate cooled output stream 65. The charging of the air cycle cooling process by bleed air 44 increases the operating pressure of the cycle (e.g., the mean or average operating pressure) compared to that of the operating pressure of the cycle without charging with bleed air 44.

FIG. 5 is a conceptual and schematic diagram illustrating another example propulsion, electrical energy generation, and cooling system 90. In some examples, system 90 of FIG. 5 represents one example implementation of the example system 30 of FIG. 2. For ease of description, features that are the same or similar to that of system 30 are numbered similarly.

As shown, system 90 includes gas turbine engine 18A, turbo-generator 20, air cycle cooling system 56, and controller 22. Bleed air 44 may be directed from one or more compressors (not labeled) of gas turbine engine 18A to supply compressed fluid to combustor 38 of turbo-generator 20. Controller 22 may control the amount of bleed air 44 supplied to combustor 38 by controlling bleed air control valve (not shown in FIG. 5). Fuel may also be supplied to combustor 38 by fuel supply 48 under the control of controller 22. Combustor 38 may ignite and combust the received fuel with bleed air 44, which drives turbine 40. The rotation of turbine 40 drive a generator (not shown in FIG. 5) which generates electrical energy from turbine 40. The exhaust from turbo-generator 20 may be combined with the exhaust from gas turbine engine 18A into a single exhaust flow from system 90. In this manner, no additional exhaust conduits out of gas turbine engine 18A are required for turbo-generator 20A.

Turbine 40 may drive the air cycle cooling performed by air cycle cooling system 90. For examples, turbine 40 may be mechanically coupled to compressor 58 and/or expander 62, e.g., to drive compressor 58 of air cycle system 90. Additionally, or alternatively, as shown in FIG. 5, engine 18A may be mechanically coupled (e.g., via shaft 63) to compressor 58 and/or expander 62, e.g., to drive compressor 58 and/or expander 62 of air cycle system 90 via turbine 28.

Bleed air 44 may also be directed from one or more compressors (not labeled) of gas turbine engine 18A to charge the operation of air cycle cooling system 56. Air cycle cooling system 56 performs an air cycle cooling process, with the process being charge by bleed air 44, to remove heat from hot input stream 65 to generate cooled output stream 65. The charging of the air cycle cooling process by bleed air 44 increases the operating pressure of the cycle (e.g., the mean or average operating pressure) compared to that of the operating pressure of the cycle without charging with bleed air 44. As a result of the charging, the fluid of air cycle cooling system may reach relatively high temperatures (e.g., about 300 degrees Fahrenheit or greater, such as, about 800 degrees Fahrenheit or greater) and relatively high densities. As described above, the increase in temperature and/or densities of the air cycle cooling system may allow for one or more components of the system to be reduced in size and/or volume while still providing desired cooling performance.

As described herein, turbo-generator 20 may include a combustor 38, turbine 40, and generator 42. As noted above, turbo-generator 20 may be supplied with bleed air 44 from gas turbine engine 18A. However, an independent fuel supply may be used. The design may also eliminate mechanical offtake limits, significantly increasing power output over a mechanical drive system.

System 30, 80, and 90 including engine 18A, turbo-generator 20, and air cycle cooling system 56 may be arranged to form a concentric, turbo-gen system with cooling, all combined into a small concentric high-speed package. In some examples, turbo-generator 20 may include an integrated flywheel, e.g., to smooth performance with high energy pulses. In some examples, the flywheel (e) may be approximately 8 inches in diameter or less. In some examples, the flywheel may operate at about 24,000 rotations per minute (rpm) or greater. Such operation may increase the flywheel energy for pulse applications, e.g., about six times over a 10,000 rpm flywheel, and engine generator output of three times.

A cooling package with components configured to function as an example air cycle cooling system 56 described herein may be bolted on or otherwise mounted directly to turbo-generator 20. Alternatively, air cycle cooling system 56 may be mounted remote from turbo-generator 20, e.g., where turbo-generator 20 is mounted directly to gas turbine engine 18A while air cycle cooling system 56 is remotely located, e.g., in fuselage 12 of aircraft 10, or driven on the accessory gear box of engine 18A. In some examples, air cycle cooling system 56 and/or turbo-generator 20 may be retrofit onto existing gas turbine engines without a significant redesign to the gas turbine engine. The combined system architecture may allow for simplified integration. In some examples, different type of turbo-generator 20 may be provided based on the desired application (e.g., a 500, 1000, or 1500 kW turbo-generator), e.g., for flexibility and multipoint power systems. In some examples, the same system may drive multiple propellers with gear reduction for distributed/hybrid power systems.

Example of the disclosure may allow for a system including performs an air cycle cooling process that is easily integrated and has a matched cooling capacity desired for the system. The system may exhibit a relatively small volume and relatively low weight suitable for aircraft in which lighter weight and/or small volume are desirable for flight or other operation of the aircraft.

EXAMPLE

The operation of two air cycle cooling processes were analyzed to evaluate the cooling performance of some examples of the disclosure. FIG. 6 is a pressure-enthalpy chart showing two example air cycle cooling processes that may by employed by, e.g., system 30 of FIG. 2, with one process in which system 56 with charged ("boosted") 98 with bleed air 44 and another in which system 56 is not charged during operation 96. The various points in the cycle are labelled for the operation 96 that is not charged by bleed air although the same points may be applied to the charged cycle 98 shown in FIG. 6. From point 1 to point 2, fluid 51 receives heat, e.g., by second heat exchanger 64, which increases the enthalpy of fluid 51. From point 2 to point 3, fluid 51 is compressed by compressor 58 to increase the pressure of fluid 51 and the temperature. From point 3 to point 4, heat is removed from fluid 51, e.g., by first heat exchanger 60, which decreases the enthalpy. From point 4 to point 1, fluid 51 is expanded by expander 62, which recovers work from compression by compressor 58, e.g., via shaft 66 to ensure high efficiency and reduce the net drive work required from turbine 40 or turbine 28.

Figure 6:
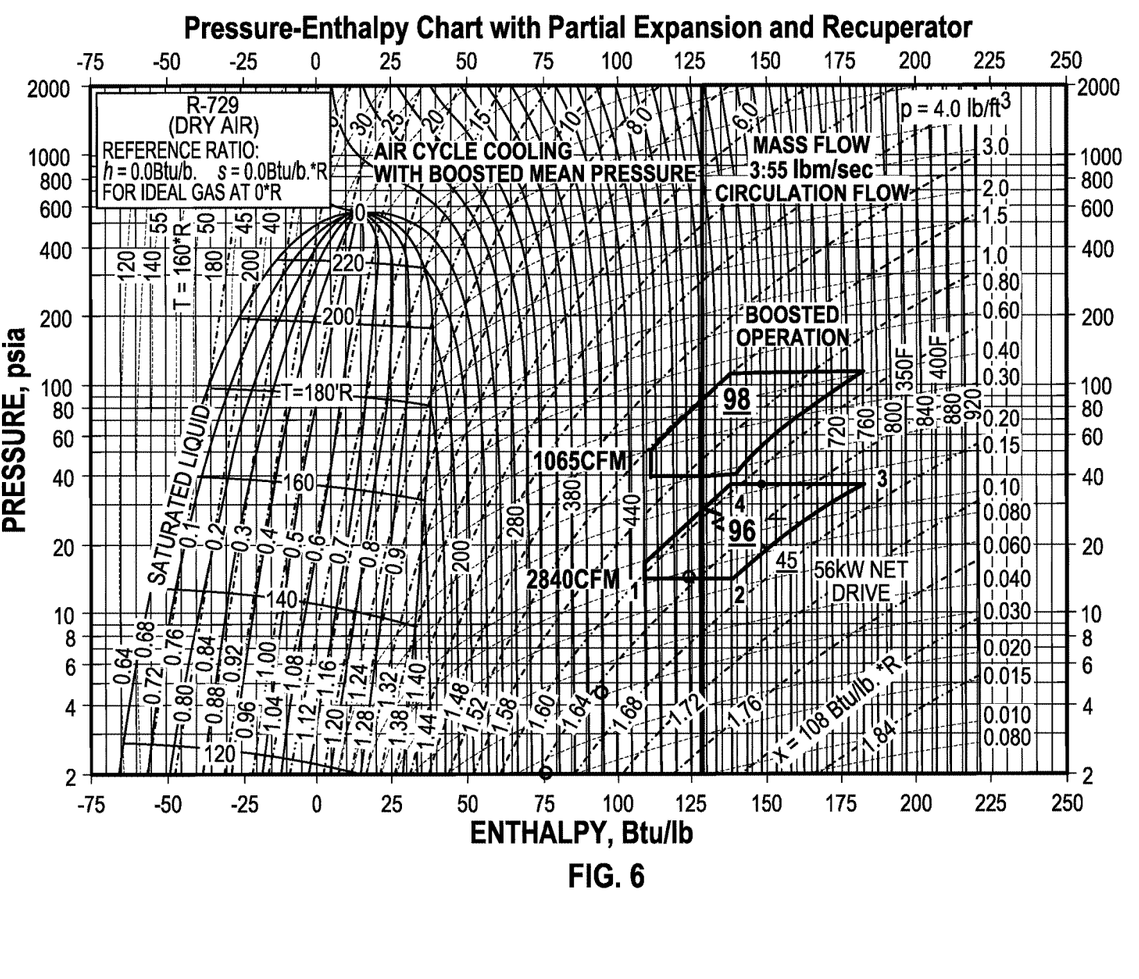
FIG. 6 is pressure-enthalpy plot illustrating an air cycle cooling process with and without charge from the bleed air.

A comparison between the charged 98 and uncharged 96 air cycle cooling operations shown in FIG. 6 illustrates similar cooling performance with reduced compressor size by 2.7:1.

Various examples have been described. These and other examples are within the scope of the following claims.

What is claimed is:

1. A propulsion, electrical generation, and cooling system comprising:
    a gas turbine engine including a first combustor, a first compressor, and a first turbine, a bleed air outlet from the first compressor, wherein the first compressor is configured to compress a first fluid which is air, wherein a portion of the compressed first fluid is directed out of the bleed air outlet to define bleed air from the first compressor, and wherein the gas turbine engine is configured to provide propulsive thrust to a vehicle;

a turbo-generator including:

a second combustor configured to combust a fuel with the bleed air received from the first compressor, wherein the second combustor is configured to receive the bleed air from the first compressor;

wherein between the bleed air outlet and the second combustor the bleed air is not further compressed or expanded by another mechanism that modifies the compression of the bleed air flowing from the bleed air outlet and directed to the second combustor, and wherein the bleed air from the first compressor is the only compressed air received by the second combustor;

a second turbine configured to receive a flow from the second combustor of the turbo-generator; and a generator operably connected to the second turbine and configured to generate electrical energy using mechanical energy received from the second turbine of the turbo-generator; and an air cycle cooling system configured to remove heat via an air cycle cooling process, wherein the air cycle cooling system includes a second compressor which compresses a second fluid, the second fluid being a refrigerant comprising R123, R245 or R744; and wherein the air cycle cooling process is charged via the bleed air from the first compressor charging the second fluid.

2. The propulsion, electrical generation, and cooling system of claim 1, wherein at least one of the second turbine of the turbo-generator or the first turbine of the gas turbine engine is configured to drive the second compressor of the air cycle cooling system.

3. The propulsion, electrical generation, and cooling system of claim 1, wherein the air cycle cooling system is driven by at least one of the turbo-generator or the gas turbine engine.

4. The propulsion, electrical generation, and cooling system of claim 1, wherein the second compressor is configured to compress the second fluid to increase a pressure of the second fluid from a first pressure to a second pressure, wherein the bleed air charges the second fluid to the first pressure.

5. The propulsion, electrical generation, and cooling system of claim 4, wherein the air cycle cooling system includes:

a first heat exchanger fluidically coupled to the second compressor, the first heat exchanger configured to remove heat from the second fluid at the second pressure;

an expander fluidically coupled to the first heat exchanger, the expander configured to expand the second fluid from the first heat exchanger to remove work from the second fluid, wherein the work at least partially drives the second compressor; and a second heat exchanger fluidically coupled to the expander, the second heat exchanger configured to remove heat from a third fluid via the second fluid, and wherein the second heat exchanger is fluidically coupled to the second compressor.

6. The propulsion, electrical generation, and cooling system of claim 1, wherein the second combustor includes a fuel inlet and a bleed air inlet, wherein the bleed air inlet is in fluid communication with the bleed air outlet from the first compressor, wherein the second combustor is configured to receive the bleed air via the bleed air inlet from the bleed air outlet and receive the fuel via the fuel inlet.

7. The propulsion, electrical generation, and cooling system of claim 1, wherein the gas turbine engine includes a first exhaust outlet and the turbo-generator includes a second exhaust outlet, wherein the first exhaust outlet and second exhaust outlet are fluidically coupled such that the first exhaust outlet and the second exhaust outlet are combined into a single exhaust outlet.

8. The propulsion, electrical generation, and cooling system of claim 1, further comprising:

a bleed air control valve between the bleed air outlet and a bleed air inlet of the second combustor; and a controller including control circuitry, wherein the controller is configured to adjust the bleed air control valve to adjust an amount of the bleed air received by the second combustor of the turbo-generator.

9. The propulsion, electrical generation, and cooling system of claim 1, further comprising:

a first fuel supply configured to supply the fuel to the first combustor of the gas turbine engine, and a second fuel supply configured to supply the fuel to the second combustor of the turbo-generator, wherein the first fuel supply is configured to supply the fuel to the first combustor of the gas turbine engine independent from the second fuel supply which supplies the fuel to the second combustor of the turbo-generator.

10. The propulsion, electrical generation, and cooling system of claim 1, wherein the first compressor of the gas turbine engine includes a high pressure stage and a low pressure stage, wherein the bleed air that charges the air cycle cooling process is supplied from the high pressure stage.

11. The propulsion, electrical generation, and cooling system of claim 1, wherein the vehicle comprises an aircraft.

12. The propulsion, electrical generation, and cooling system of claim 1, wherein the bleed air flows through a bleed air line from the bleed air outlet of the first compressor of the gas turbine engine to the second combustor of the turbo-generator.

13. The propulsion, electrical generation, and cooling system of claim 12, wherein the bleed air flows from the first compressor of the gas turbine engine through the bleed air line which splits into a first bleed air line and a second bleed air line, wherein the first bleed air line flows the bleed air to the second combustor of the turbo-generator, and wherein the second bleed air line flows the bleed air to the air cycle cooling system.

14. A method comprising:

a propulsion, electrical generation, and cooling system comprising:

a gas turbine engine including a first combustor, a first compressor, and a first turbine, a bleed air outlet from the first compressor, wherein the first compressor is configured to compress a first fluid which is air, wherein a portion of the compressed first fluid is directed out of the bleed air outlet to define bleed air from the first compressor, and wherein the gas turbine engine is configured to provide propulsive thrust to a vehicle;

a turbo-generator including:

a second combustor configured to combust a fuel with the bleed air received from the first compressor, wherein the second combustor is configured to receive the bleed air from the first compressor;

wherein between the bleed air outlet and the second combustor the bleed air is not further compressed or expanded by another mechanism that modifies the compression of the bleed air flowing from the bleed air outlet and directed to the second combustor, and wherein the bleed air from the first compressor is the only compressed air received by the second combustor;

a second turbine configured to receive a flow from the second combustor of the turbo-generator; and a generator operably connected to the second turbine and configured to generate electrical energy using mechanical energy received from the second turbine of the turbo-generator; and an air cycle cooling system configured to remove heat via an air cycle cooling process, wherein the air cycle cooling system includes a second compressor which compresses a second fluid, the second fluid being a refrigerant comprising R123, R245 or R744; and wherein the air cycle cooling process is charged via the bleed air from the first compressor charging the second fluid;

the method further comprising:

compressing the first fluid which is air a fluid via the first compressor of the gas turbine engine; wherein the portion of the compressed first fluid is directed out of the bleed air outlet of the first compressor to define the bleed air from the first compressor;

receiving the bleed air via the second combustor of the turbo-generator from the first compressor of the gas turbine, wherein between the bleed air outlet and the second combustor the bleed air is not further compressed or expanded by another mechanism that modifies the compression of the bleed air, wherein the second combustor of the turbo-generator is configured to combust the fuel with the received bleed air, wherein the turbo-generator is configured to generate the electrical energy from the combustion of the fuel by the second combustor; and charging the air cycle cooling system via the bleed air from the first compressor charging the second fluid, wherein the air cycle cooling system is configured to remove the heat via the air cycle cooling process.

15. An aircraft comprising:

a propulsion, electrical generation, and cooling system comprising:

a gas turbine engine including a first combustor, a first compressor, and a first turbine, a bleed air outlet from the first compressor, wherein the first compressor is configured to compress a first fluid which is air, wherein a portion of the compressed first fluid is directed out of the bleed air outlet to define bleed air from the first compressor, and wherein the gas turbine engine is configured to provide propulsive thrust to the aircraft;

a turbo-generator including:

a second combustor configured to combust a fuel with the bleed air received from the first compressor, wherein the second combustor is configured to receive the bleed air from the first compressor; wherein between the bleed air outlet and the second combustor the bleed air is not further compressed or expanded by another mechanism that modifies the compression of the bleed air flowing from the bleed air outlet and directed to the second combustor, and wherein the bleed air from the first compressor is the only compressed air received by the second combustor;

a second turbine configured to receive a flow from the second combustor of the turbo-generator; and a generator operably connected to the second turbine and configured to generate electrical energy using mechanical energy received from the second turbine of the turbo-generator, an air cycle cooling system configured to remove heat via an air cycle cooling process, wherein the air cycle cooling system includes a second compressor which compresses a second fluid, the second fluid being a refrigerant comprising R123, R245 or R744; and wherein the air cycle cooling process is charged via the bleed air from the first compressor charging the second fluid; and an electrical load configured to receive the electrical energy from the generator of the turbo-generator while both the turbo-generator and the gas-turbine engine are in operation.

16. The aircraft of claim 15, wherein the electrical load comprises one or more of a directed energy system, a radar system, or a lift system.

* * * * *